US011937700B2

(12) United States Patent
Maurer

(10) Patent No.: US 11,937,700 B2
(45) Date of Patent: Mar. 26, 2024

(54) ADJUSTABLE BEDDING COVER HEIGHT AND LENGTHWISE POSITIONING APPARATUS

(71) Applicant: Scott D. Maurer, Asheville, NC (US)

(72) Inventor: Scott D. Maurer, Asheville, NC (US)

( * ) Notice: Subject to any disclaimer, the term of this patent is extended or adjusted under 35 U.S.C. 154(b) by 0 days.

(21) Appl. No.: 17/588,971

(22) Filed: Jan. 31, 2022

(65) Prior Publication Data

US 2022/0151393 A1 May 19, 2022

Related U.S. Application Data

(63) Continuation of application No. 16/577,263, filed on Sep. 20, 2019, now Pat. No. 11,324,329.

(51) Int. Cl.

*A47C 21/02* (2006.01)
*A61G 7/05* (2006.01)
*A61G 7/075* (2006.01)

(52) U.S. Cl.

CPC .......... *A47C 21/024* (2013.01); *A47C 21/022* (2013.01); *A61G 7/0501* (2013.01); *A61G 7/0755* (2013.01)

(58) Field of Classification Search

CPC ..... A47C 21/024; A47C 21/02; A47C 19/045; A47C 20/021; A47C 21/022; A61G 7/0501; A61G 13/101; A45C 13/262; A45C 2013/267; B62B 2202/24; B62B 1/125

USPC ....................................... 5/505, 505.1, 504.1

See application file for complete search history.

(56) References Cited

U.S. PATENT DOCUMENTS 3,317,932 A 5/1967 Gibbons
4,214,327 A * 7/1980 Smith ................. A47C 21/024 5/426
5,109,872 A 5/1992 Conn
5,781,945 A * 7/1998 Scherer ................. A47C 21/08 5/426
5,881,406 A 3/1999 Cobb
6,611,979 B2 9/2003 Welling et al.
6,834,403 B1 12/2004 Elliott
6,895,615 B2 5/2005 Dilascio
7,152,259 B1 12/2006 Goodwin
7,231,680 B1 6/2007 Hafford et al.

(Continued)

OTHER PUBLICATIONS

"Telescopic." Telescopic—Dictionary.com, www.dictionary.com/browse/telescoping.*

*Primary Examiner* — Justin C Mikowski
*Assistant Examiner* — Madison Emanski
(74) *Attorney, Agent, or Firm* — The Van Winkle Law Firm; William G. Heedy

(57) ABSTRACT

An adjustable bedding (18) cover height and lengthwise positioning apparatus (30). A base (32) is configured for positioning between a bed frame (12) and an adjacent mattress (14). At least one riser (36, 38) allows adjustment of the height and lengthwise positioning of bedding with respect to the mattress. A connecting section (34), connected between the base and the risers optionally allows rotation of the risers with respect to the base. A clip (34) is connected to the at least one riser and secures the bedding to the apparatus. An optional top support (40) provides a support width for the bedding which is preferably at least as broad as the width between a user's feet when the user is sleeping on his or her back. An optional friction strip (39) on the base prevents slippage of the apparatus.

18 Claims, 16 Drawing Sheets

(56) References Cited

U.S. PATENT DOCUMENTS

| | | | | |
|---|---|---|---|---|
| 7,874,092 | B2 | 1/2011 | Alston | |
| 7,996,938 | B1 | 8/2011 | Calmes et al. | |
| 8,272,086 | B1 * | 9/2012 | Calmes | A47C 21/024<br>5/505.1 |
| 2006/0248647 | A1 | 11/2006 | Huber | |
| 2009/0056019 | A1 | 3/2009 | Alston | |
| 2009/0235455 | A1 | 9/2009 | Strickland | |
| 2015/0238019 | A1 * | 8/2015 | Farahani | A47C 21/024<br>5/505.1 |
| 2015/0305511 | A1 | 10/2015 | Lenz | |
| 2019/0231080 | A1 | 8/2019 | Reale | |

* cited by examiner

ADJUSTABLE BEDDING COVER HEIGHT AND LENGTHWISE POSITIONING APPARATUS

RELATED APPLICATION

This application is a Continuation application of co-pending U.S. Nonprovisional patent application Ser. No. 16/577,263 filed on Sep. 20, 2019, entitled “Adjustable Bedding Cover Height And Lengthwise Positioning Apparatus.”

BACKGROUND

For comfort and warmth, a person generally wishes to have one or more of a sheet, a blanket, a bedspread, or a comforter (individually, and collectively, “bedding”) covering the person’s body. Generally, the bedding is tucked in at the foot of the bed between the frame or box spring and the mattress. Because sheets are a standard length, the more sheet that is tucked in, and the thicker the mattress, the less sheet is available to cover the individual. Thus, individuals sleeping on their backs, taller individuals, and/or individuals sleeping on thicker mattresses (certain mattresses are 18" thick) may feel that the sheet or bedding is “too short”, that is, it does not extend far enough on the top part of the individual’s body to provide the desired comfort and warmth. Further, when a person is sleeping on his/her back, his/her feet generally point upward, rather than lying flat against the mattress. The weight of the bedding on the person’s feet, exaggerated by the tension caused by the bedding being tucked in at the foot of the bed, tends to force the feet toward a downward pointing position, which many people find uncomfortable. Further, persons with foot or ankle injuries, or irritated skin, such as from sunburn, poison ivy, burns, or other conditions, often find any contact, weight, or pressure by the bedding on their feet to be uncomfortable or even painful. An adjustable bedding cover height and lengthwise positioning apparatus, described below, positions the bedding away from the person’s feet, thereby assisting the person in getting a good night’s sleep, while also facilitating changing the lengthwise positioning of the bedding covers.

DETAILED DESCRIPTION

An adjustable bedding cover height and lengthwise positioning apparatus is disclosed herein. Prior to discussion of the construction of the adjustable bedding cover height and lengthwise positioning apparatus it may be beneficial to discuss a typical environment in which the apparatus might be used.

Figure 1:
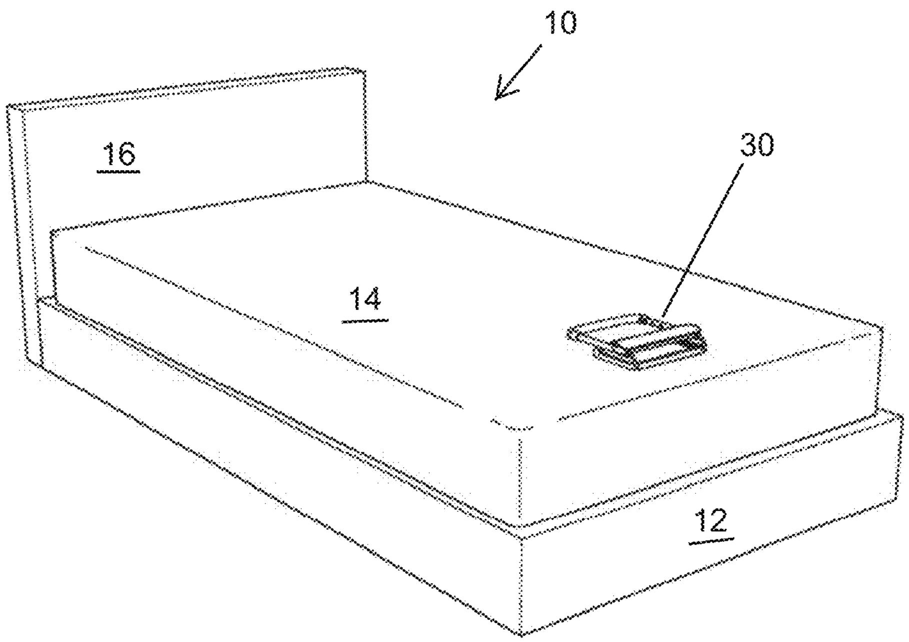
FIG. 1 is an illustration of a bed having a frame and a mattress, with an adjustable bedding cover height and lengthwise positioning apparatus lying on top of the bed.

FIG. 1 is an illustration of a bed 10 having a frame 12 and a mattress 14, with the adjustable bedding cover height and lengthwise positioning apparatus 30 (hereinafter the “apparatus”) lying on top of the bed 10. An optional headboard 16 is also shown. Some beds are made with a frame, other beds are made with a box spring, depending upon customer and manufacturer preferences. Therefore, to avoid having to repeatedly express these components in the alternative, such as “frame or box spring,” the term “frame,” as used herein, also includes a box spring. For convenience of illustration, the bedding reference numeral 18 in FIG. 2) is not shown but would be placed on the bed 10 and a portion of the foot of the bedding would be clipped into the apparatus 30.

Figure 2:
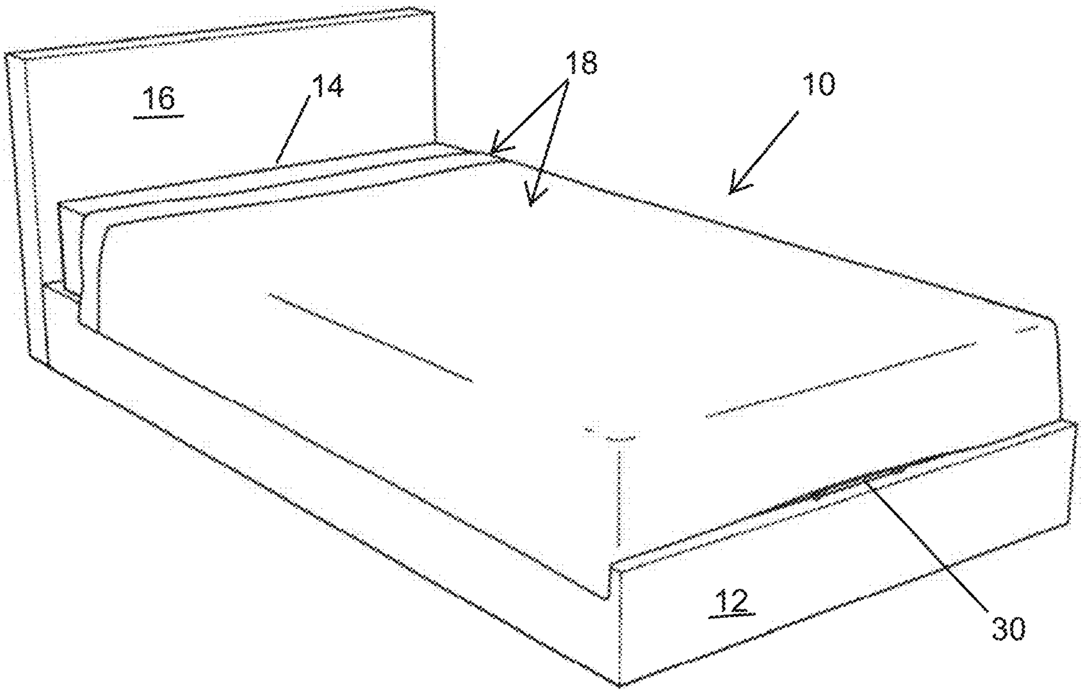
FIG. 2 is an illustration of a bed showing the bedding and also showing the apparatus in a collapsed position and placed between the frame and the mattress.

FIG. 2 is an illustration of a bed 10 showing the bedding 18 and also showing the apparatus 30 in a collapsed position and placed between the frame 12 and the mattress 14. The bedding 18 is still clipped to the apparatus 30 so, as the apparatus 30 is tucked between the frame 12 and the mattress 14, the bedding 18 is also tucked between the frame 12 and the mattress 14. Bedding 18 may, for example, include one or more top sheets, one or more blankets, a bedspread, cover, quilt, and/or comforter. Although not shown for convenience of illustration, the bed 10 may optionally also have one or more pillows, a footboard, a mattress pad, and/or a bottom sheet (often a fitted sheet).

Figure 3:
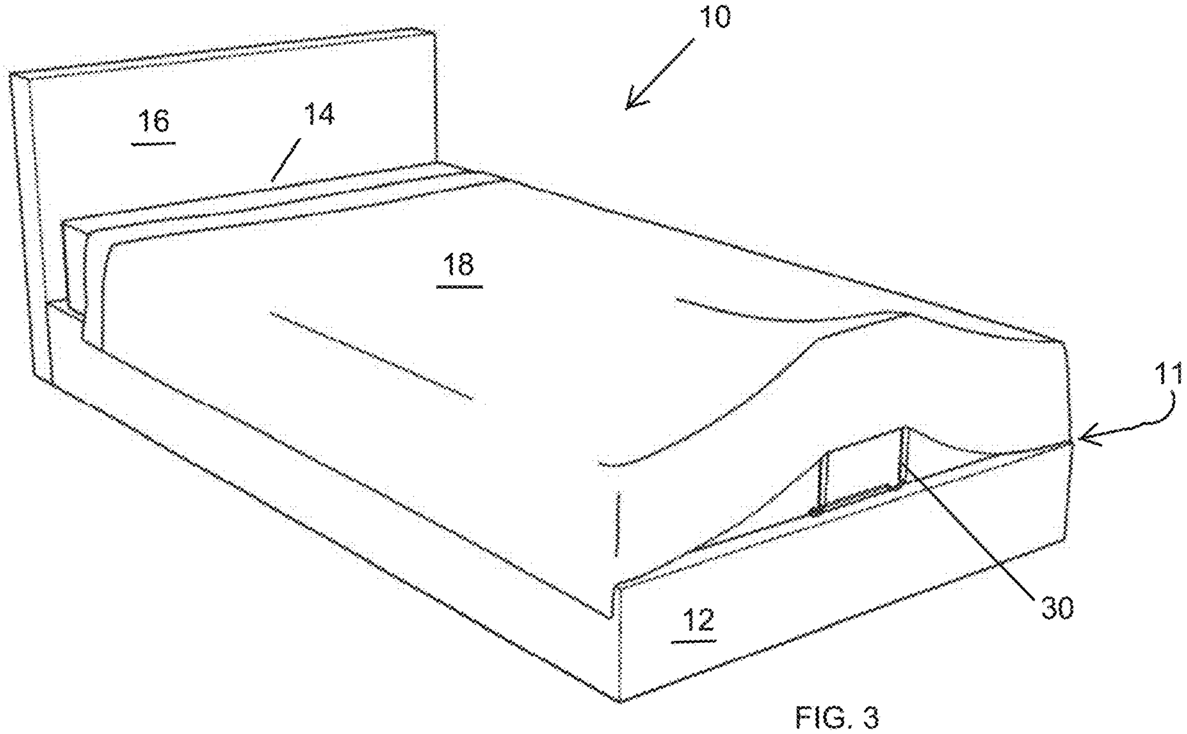
FIG. 3 is an illustration of a bed showing the apparatus in an extended position and elevating the bedding at the foot of the bed.

FIG. 3 is an illustration of a bed 10 showing the apparatus 30 in an extended position and elevating the bedding 18 at the foot 11 of the bed 10.

Figure 4:
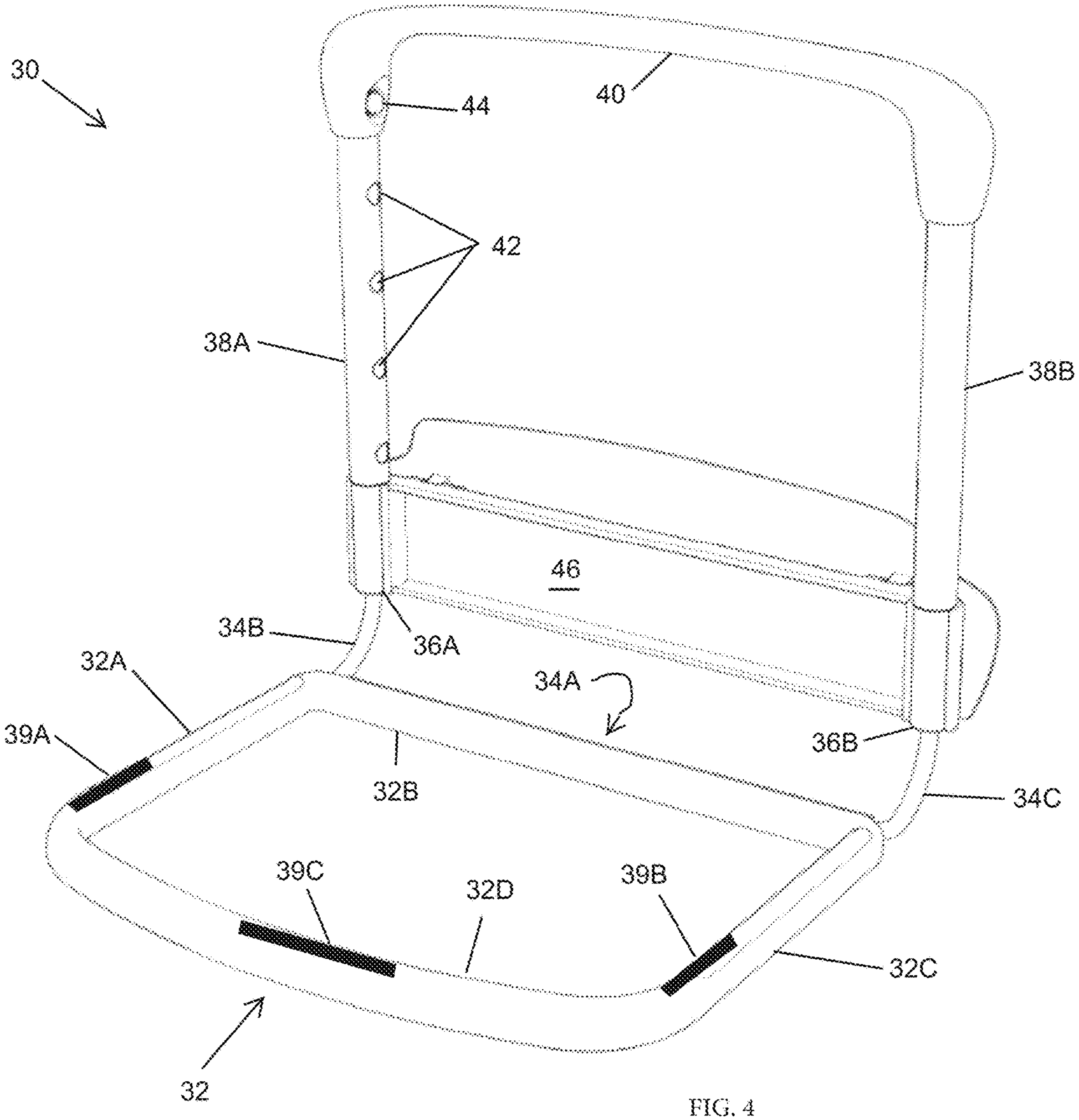
FIG. 4 illustrates one implementation of the apparatus having a base, a connecting section, first and second telescoping interior risers, first and second telescoping exterior risers, a top support, a plurality of locking holes in the telescoping exterior risers, depressible locking pins, and a clip.

FIG. 4 illustrates one implementation of the apparatus 30 having a base 32, a connecting section 34 (34A, 34B, 34C), first and second telescoping interior risers 36A, 36B, first and second telescoping exterior risers 38A, 38B, top support 40, a plurality of locking holes 42 in the telescoping exterior risers 38A, 38B, depressible locking pins 44, and a clip 46. The telescoping risers 36A, 36B, 38A, 38B may be considered to be extendable risers. The base 32 preferably has at least two legs 32A, 32C and a back side 32B. More preferably, the base 32 also has a front side 32D for additional rigidity. The connecting section 34 has a center section 34A, a right arm 34B, and a left arm 34C. Preferably, the apparatus 30 has a width between the telescoping risers 36A, 36B, 38A, 38B which is approximately the same as the width between the user's feet when the user is sleeping on his or her back in the bed 10. In an embodiment, the top support 40 is in the form of an arch.

Also, in an embodiment, the base 32 preferably has one or more friction strips 39 (39A, 39B, 39C) attached thereto, such as by glue, double-sided tape, or another convenient adhesive. The strips 39 are made of a non-slippery material, such as rubber, so as to prevent the apparatus 30 from slipping around once it is inserted between the frame 12 and the mattress 14. Although the strips 39 are shown on the top side of the base 32, the strips 39 could also be placed on the bottom side of the base 32, or on both sides of the base 32. Also, the strips 39A, 39B, 39C could be a single continuous strip, or two strips, or four or more strips, as desired, rather than being three strips. The shape, length, width, and positioning of the strip or strips 39, as shown, is exemplary and may be varied.

Figure 5:
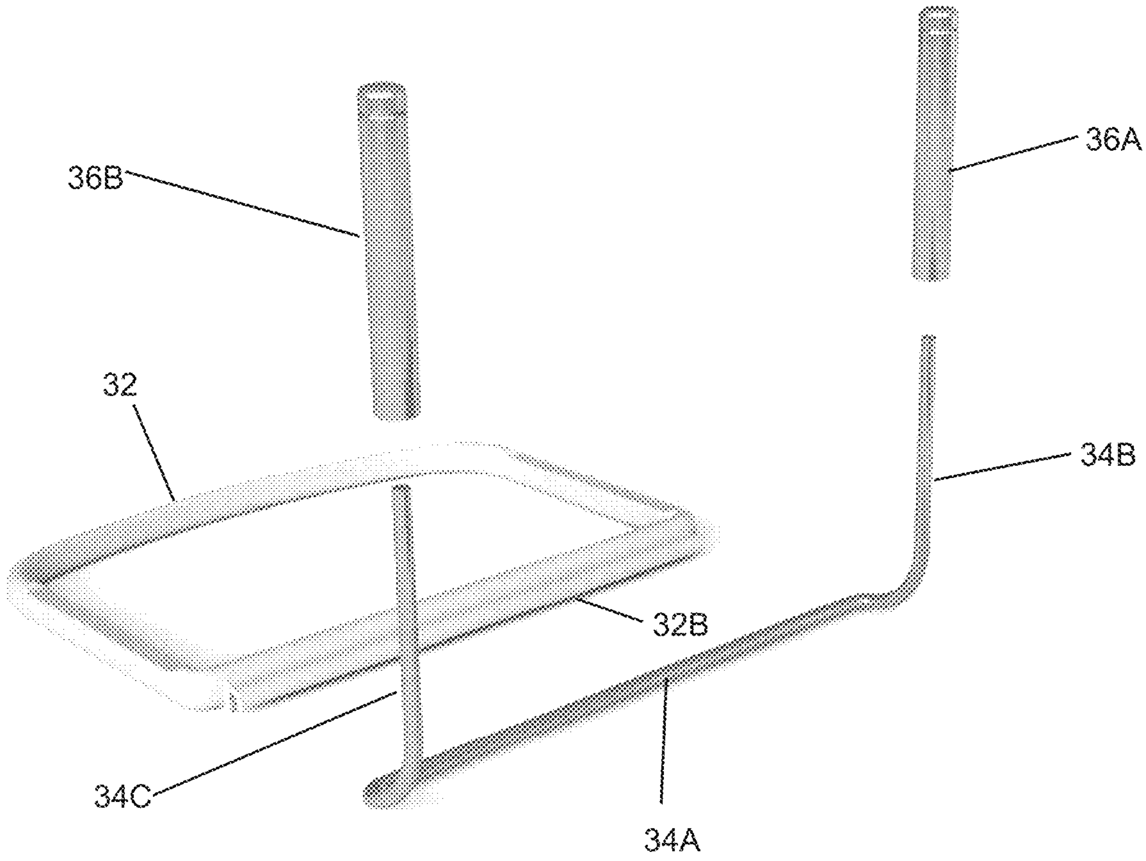
FIG. 5 is an exploded view showing the base, the back side of the base, the connecting section, and the telescoping risers.

FIG. 5 is an exploded view showing the base 32, the back side 32B of the base 32, the connecting section 34 (34A, 34B, 34C), and the telescoping risers 36A, 36B.

Figure 6:
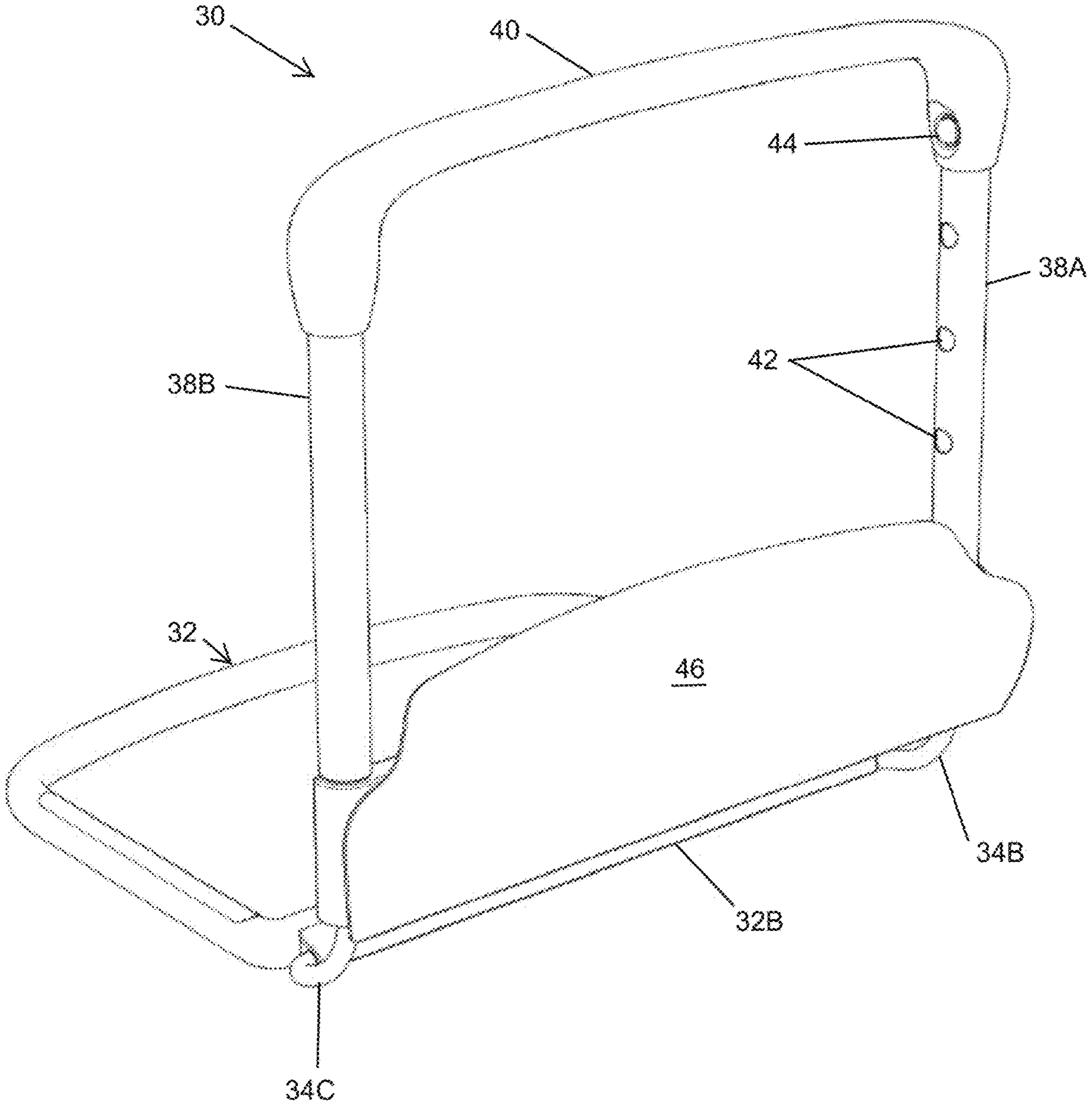
FIG. 6 illustrates a rear perspective view of the apparatus.

FIG. 6 illustrates a rear perspective view of the apparatus 30. The back side 32B of the base 32 is configured to accept the center section 34A. The back side 32B of the base 32 may be configured, for example, as an elongate inverted "U" into which the center section 34A is inserted. This allows rotation of the base 32 with respect to the other components 34, 36, 38, and 40, so that the apparatus 30 may be folded over to place components 34, 36, 38, and 40 in a position substantially parallel to the base 32. In use, the base 32 is placed between the frame 12 and the mattress 14.

Returning to FIGS. 4 and 5, an upper portion of the right arm 34B and an upper portion of the left arm 34C are at least partially inserted into, and are preferably movable within, lower telescoping risers 36A and 36B, respectively, by, for example, press fit, friction fit, adhesive, or screws. In another embodiment, the upper portions of the right arm and left arm 34B and 34C are fixed within the lower telescoping risers 36A and 36B, respectively, by, for example, welding. In another embodiment, there is a mechanical stop on the upper portions of the right riser and left riser 34B and 34C and/or the lower telescoping risers 36A and 36B, to prevent inadvertent separation thereof.

The lower telescoping risers 36A, 36B, are at least partially inserted into the upper telescoping risers 38A and 38B, respectively, and may be moved further into, or out of, the upper telescoping risers 38A, 38B so as to adjust the height of the apparatus 30. The upper telescoping risers 38A, 38B have a plurality of locking holes 42, and each lower telescoping riser 36A, 36B has a depressible locking pin 44. A locking pin 44 protrudes though a locking hole 42 to fix the risers 36, 38 with respect to each other so as to provide a desired fixed height of the bedding 18 above the mattress 14. When locking pin 44 is depressed, the risers 36, 38 are slidable relative to each other to adjust the height. By adjusting the risers 36, 38, the user can adjust the height of the top support 40 above the mattress 12.

The top support 40 is beneath the bedding 18. Therefore, adjusting the risers 36, 38 adjusts the height of the top support 40, which adjusts the height of the bedding 18 above the mattress 14. The risers 36, 38 are preferably adjusted to provide a height for the top support 40 which prevents the bedding 18 from contacting or weighing on the user's feet. The height of the bedding 18 is preferably not raised so much that outside air is allowed to come under the bedding 18.

It will be appreciated that when the apparatus 30 is extended then the bedding 18 may be disposed to slip over the top support 40 and then fall onto the user's feet. The clip 46 (FIGS. 4, 6) captures the bedding 18 to prevent such slipping.

Preferably, the clip 46 is fixed to the telescoping interior risers 36A, 36B toward the bottom of those risers. The bedding 18 is captured between the clip 46 and the risers 38.

In another implementation, the clip 46 may be adjustable along the length of the telescoping interior risers 36A, 36B. The clip 46 may then be used, for example, in a raised position (not shown), away from the bottom of risers 36A, 36B, such as when the mattress 14 has a thickness that requires a raised position of the clip in order to maintain proper bedding length.

In another implementation, the clip 46 may also be adjustable along the length of the telescoping exterior risers 38A, 38B. The clip 46 may then capture the bedding 18 between the clip 46 and the risers 38 or, if desired, between the clip 46 and the top support 40.

If the clip 46 is adjustable, then it may be held in a desired position by any user-convenient means, such as, for example, by friction, screws, protrusions which mate with the holes 46, etc.

Figure 7:
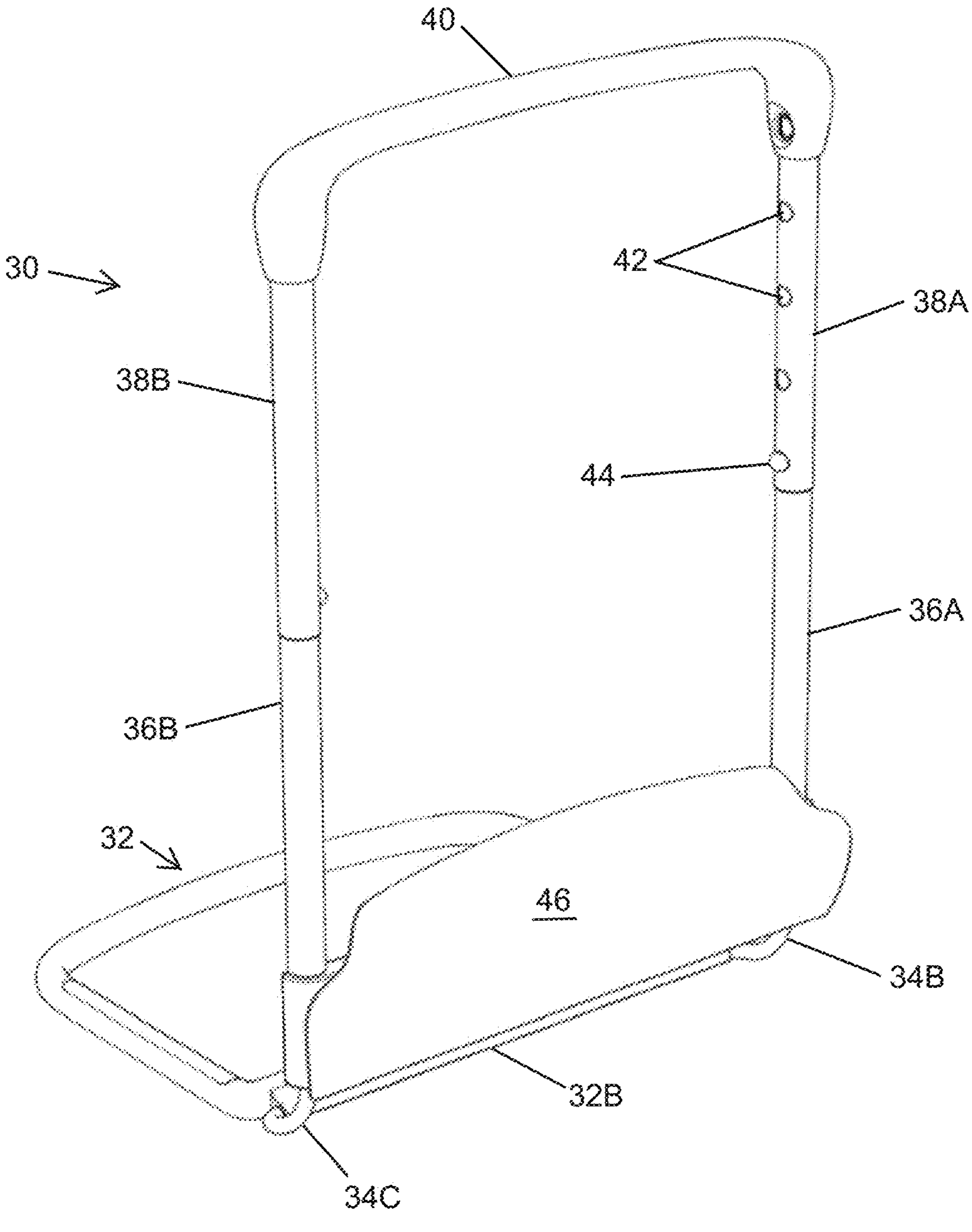
FIG. 7 illustrates a rear perspective view of the apparatus with the telescoping risers in an extended position so as to raise the height of the bedding in order to adjust to the height of the mattress.

FIG. 7 illustrates a rear perspective view of the apparatus 30 with the telescoping risers 36A, 36B, 38A, 38B in an extended position so as to raise the height of the bedding 18 in order to accommodate the height of the mattress 14.

Figure 8:
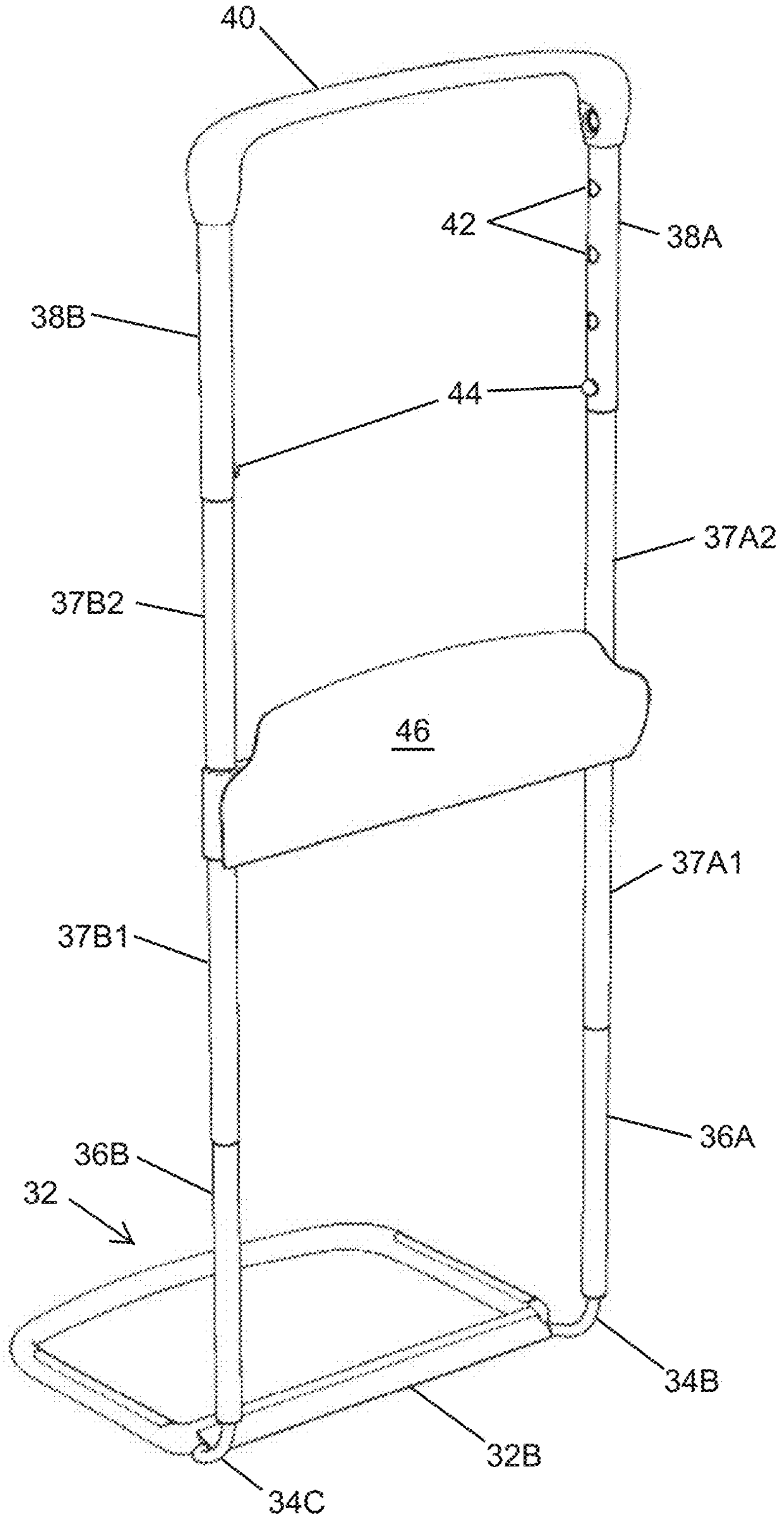
FIG. 8 is an illustration wherein there are four sets of telescoping risers.

In another implementation, there may be more than two sets telescoping risers. FIG. 8 is an illustration wherein there are four sets of telescoping risers: (1) 36A and 36B, (2) 37A1 and 37B1, (3) 37A2 and 37B2, and (4) 38A and 38B. There may also be only three sets of telescoping risers, such as by omitting set 37A2 and 37B2. The clip 46 may be fixedly attached to a set of risers or may be adjustable to be positioned on any set of risers. Thus, the clip 46 may be adjusted to best retain the bedding 18 in a desired position.

Figure 9:
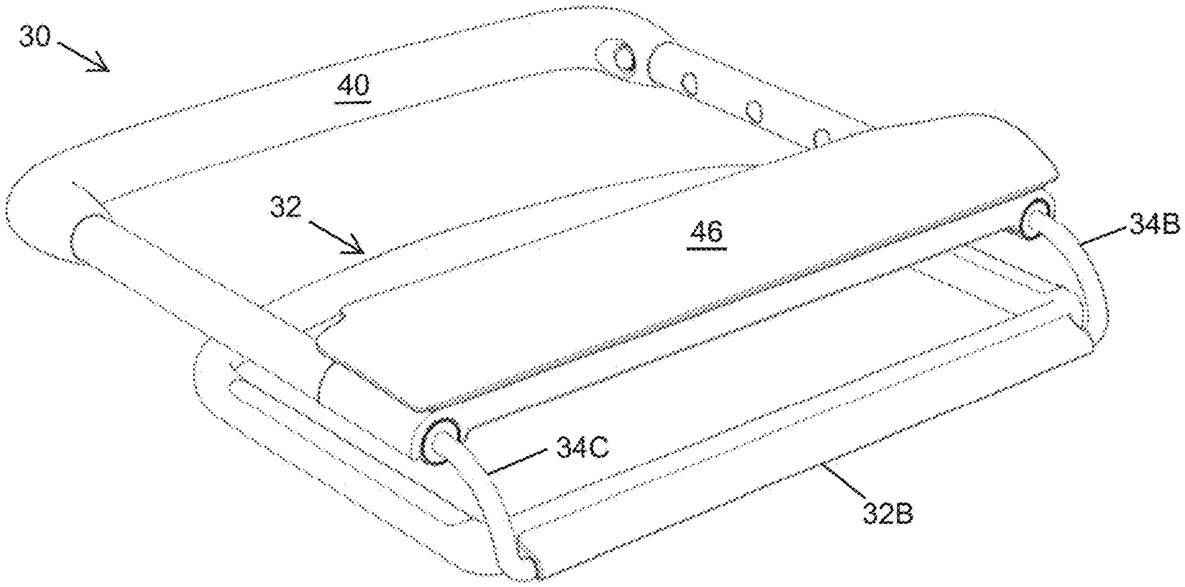
FIG. 9 illustrates the apparatus in a folded position.
Figure 10:
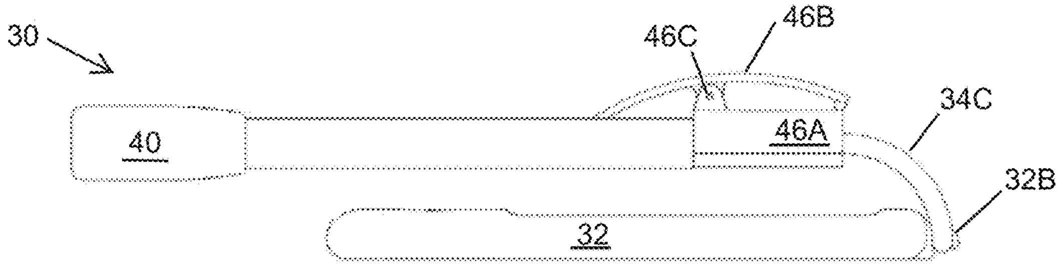
FIG. 10 illustrates the apparatus in a folded position and also illustrates details of construction of the clip.
Figure 11:
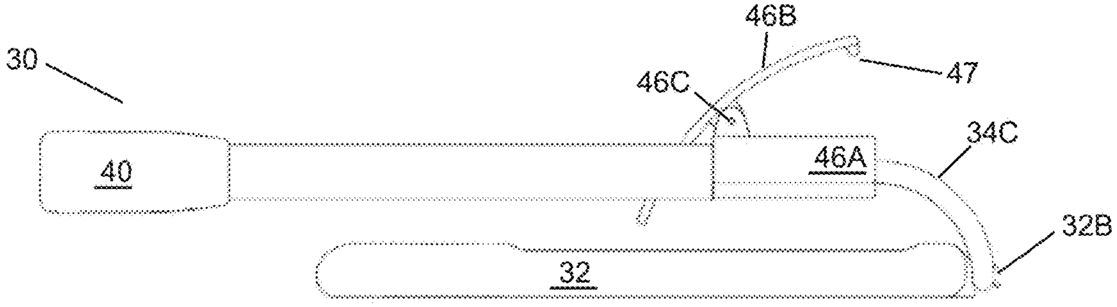
FIG. 11 illustrates the apparatus in a folded position, illustrates details of construction of the clip and illustrates the apparatus with the clip in a depressed position.

FIGS. 9-11 illustrate the apparatus 30 in a folded position for (1) bedding makeup, wherein a user may use the clip 46 to selectively secure the bedding 18 to the apparatus 30 prior to the user placing the apparatus 30 between the frame 12 and the mattress 14, and (2) stowing the apparatus 30, such as under the bed 10 or between the mattress 14 and the frame 12.

FIGS. 10 and 11 also illustrate details of construction of the clip 46. The clip 46 preferably comprises a pair of cylindrical retaining components 46A, a bedding retaining component 46B, and a pair of pins 46C. The cylindrical retaining components 46A may either be fixed in position on the telescoping interior risers 36A, 36B, may be adjustable in position thereon, or may also be adjustable in position on the telescoping exterior risers 38A, 38B. Bedding retaining component 46B is preferably in the shape of an arch and is pivotable on pin 46C so that the bedding retaining component 46B can capture and hold the bedding 18 to prevent slippage thereof. Clip 46 also preferably has at least one friction strip 47 attached thereto, such as by glue, double-sided tape, or another convenient adhesive. The friction strip 47 is made of a non-slippery material, such as rubber, so as to prevent the bedding 18 from slipping off of the clip 46. Also, the strip 47 could be two or more strips, as desired, rather than being a single strip. The shape, length, width, and positioning of the strip or strips 47, as shown, is exemplary and may be varied.

FIG. 11 illustrates the apparatus 30 with the clip 46 in a depressed position whereby the bedding 18 may be captured by the bedding retaining component 46B and, therefore, held by the clip 46, prior to the apparatus 30 being placed between the frame 12 and the mattress 14.

Figure 12:
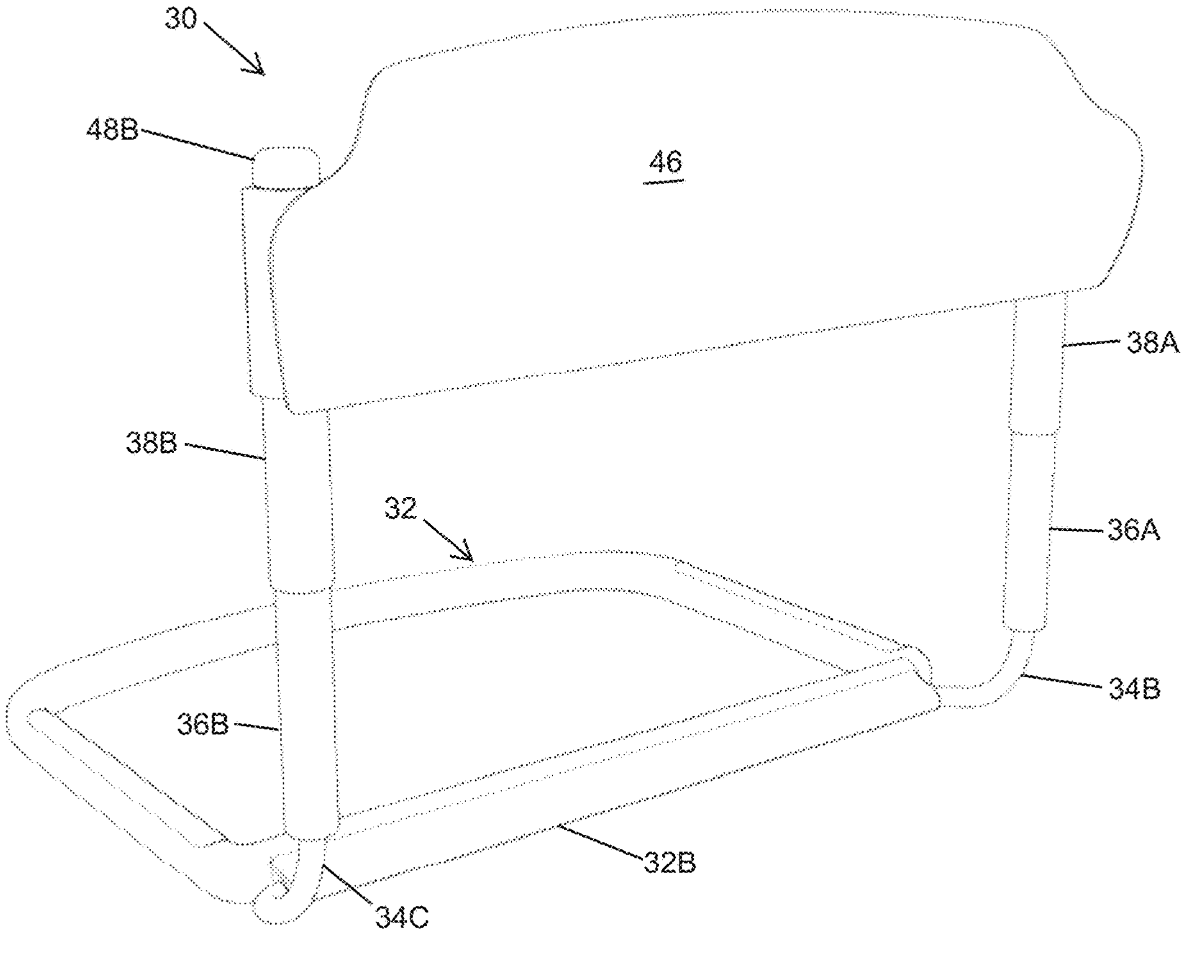
FIG. 12 illustrates an implementation wherein the top support is not used.

FIG. 12 illustrates an implementation wherein the top support 40 is not used. Rather, the clip 46 is preferably positioned at the top end of the telescoping exterior risers 38A, 38B, so as to hold the bedding 18 against the telescoping exterior risers 38A, 38B and/or top caps 48A (FIG. 13), 48B.

Figure 13:
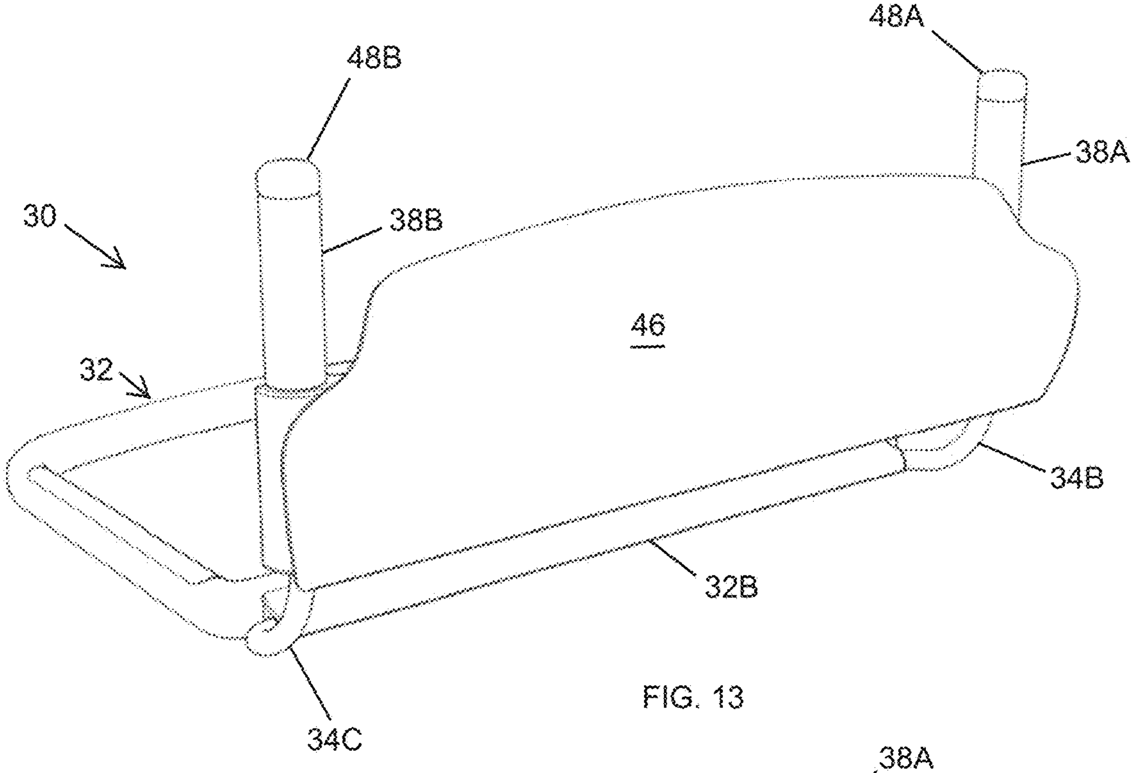
FIG. 13 illustrates the implementation of FIG. 12 where the telescoping risers are collapsed, and the clip is positioned at the lower end of the risers.

FIG. 13 illustrates the implementation of FIG. 12 where the telescoping risers are collapsed, and the clip 46 is positioned at the lower end of the risers 38A, 38B.

Figure 14:
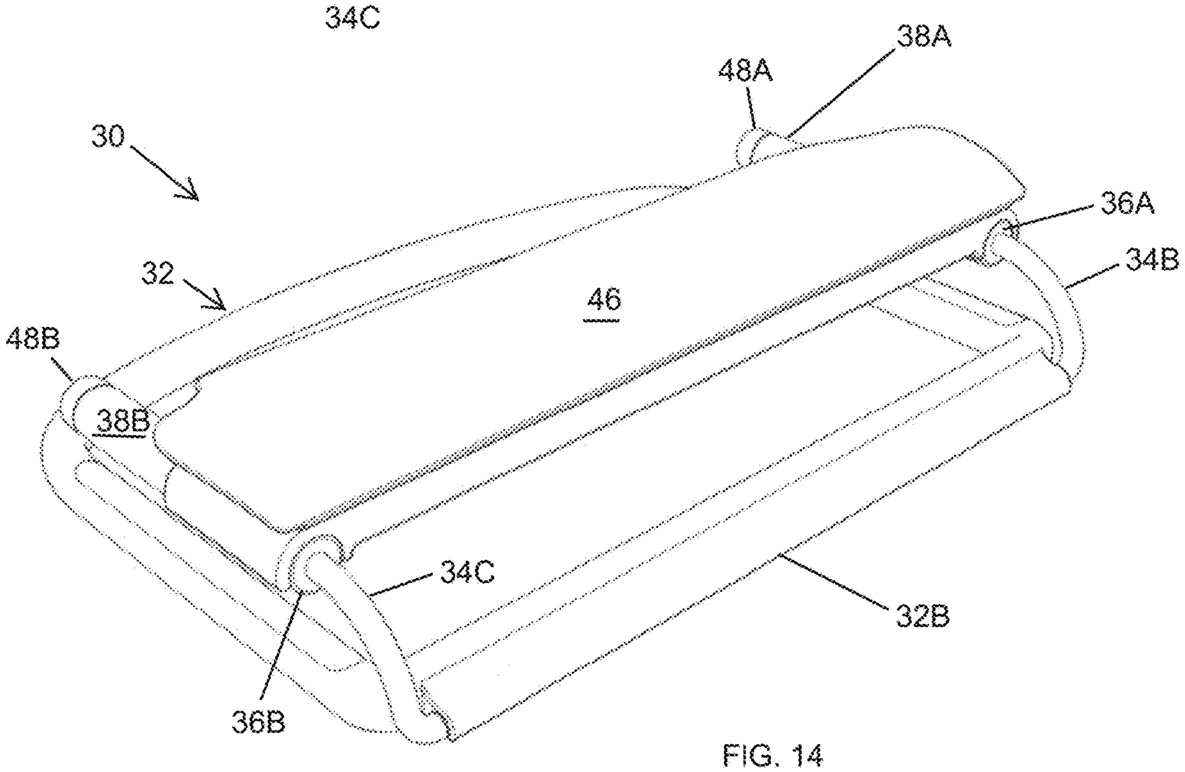
FIG. 14 illustrates the implementation of FIG. 13 wherein the apparatus 3 is folded, such as for bedding makeup and stowage.

FIG. 14 illustrates the implementation of FIG. 13 wherein the apparatus 30 is folded, such as for bedding makeup and stowage.

Figure 15:
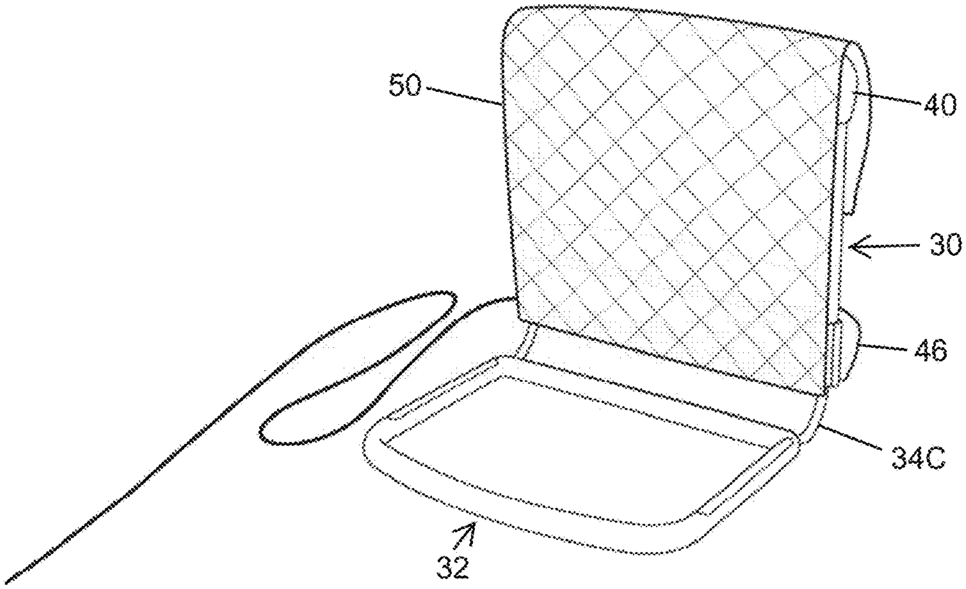
FIG. 15 illustrates an environment of the apparatus of FIG. 4 wherein a heating pad or blanket is draped over the apparatus to provide additional heating or warmth for the feet of the user.

FIG. 15 illustrates an environment of the apparatus of FIG. 4 wherein a heating pad or blanket 50 is draped over the apparatus 30 to provide additional heating or warmth for the feet of the user.

Figure 16:
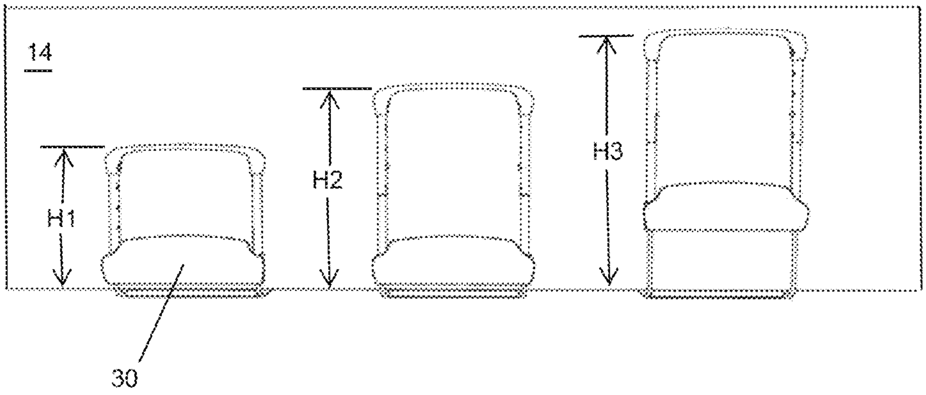
FIG. 16 illustrates the apparatus adjusted to different heights to accommodate a user preference with respect to the height of the mattress.

FIG. 16 illustrates the apparatus 30 adjusted to different heights H1, H2, H3 to accommodate a user preference with respect to the height of the mattress 14.

Figure 17:
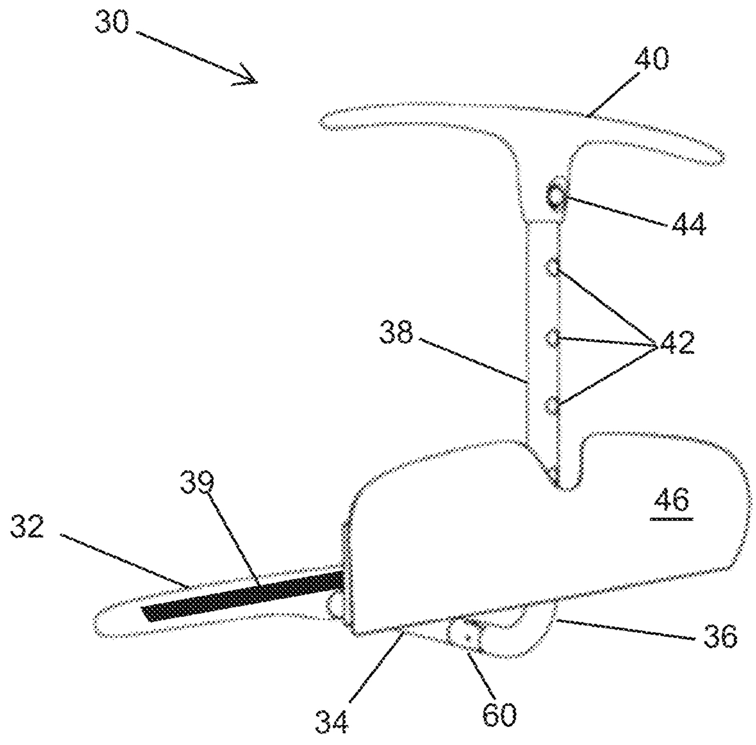
FIG. 17 illustrates another embodiment of the apparatus.

FIG. 17 illustrates another embodiment of the apparatus 30. In this embodiment there is a base 32, a connecting section 34, a single telescoping interior riser 36, the connecting section 34 is preferably, but not necessarily, rotatably connected to the telescoping interior riser 36 at a joint 60, a single telescoping exterior riser 38, a clip 46, and an optional top support 40. The telescoping risers 36, 38 may be considered to be a single extendable riser. Also shown are a plurality of locking holes 42 in the telescoping exterior riser 38 and a depressible locking pin 44, which allow adjustment of the height of the apparatus 30 by adjusting the position of the telescoping exterior riser 38 along the telescoping interior riser 36. Although only two telescoping risers 36, 38 are shown, there may be three or more telescoping risers, if desired, all forming the extendable riser.

In this embodiment, the base 32 and top support 40 are preferably "T"-shaped with the base of the "T" preferably being approximately midway of the cross of the "T". Also, either or both the base 32 and the top support 40 may be in the shape of an arch. The clip 46 captures the bedding 18 against the telescoping exterior riser 38 to prevent slippage of the bedding 18, as discussed above. Also, the apparatus 30 preferably includes at least one friction strip 39 so as to prevent the apparatus 30 from slipping around once it is inserted between the frame 12 and the mattress 14.

Figure 18:
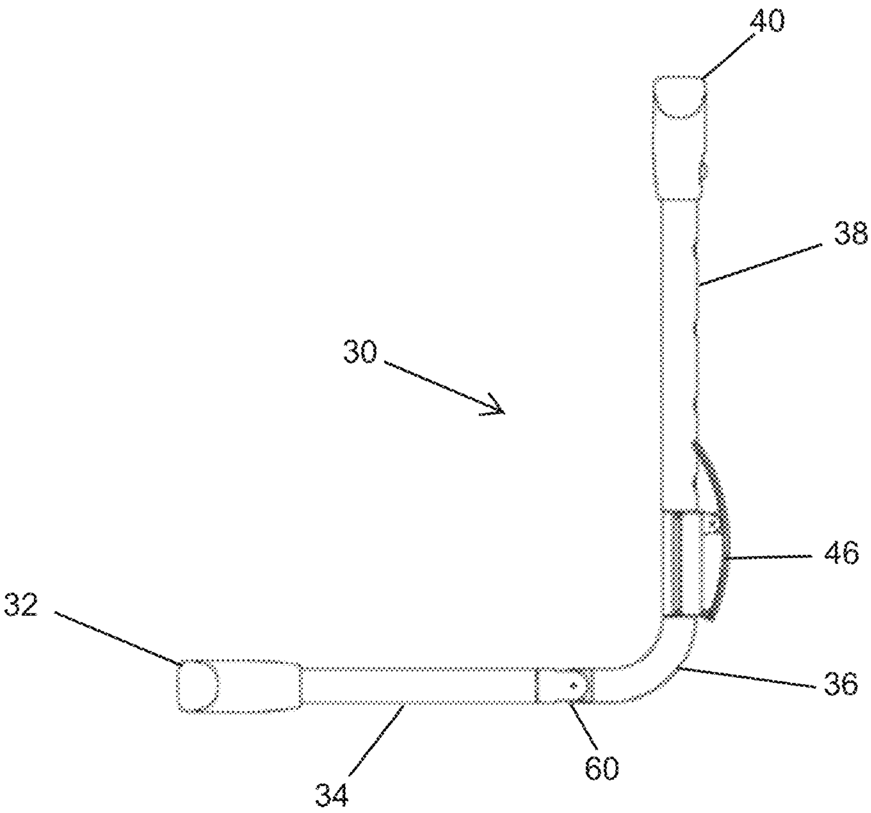
FIG. 18 illustrates a side view of the apparatus of FIG. 17.

FIG. 18 illustrates a side view of the apparatus 30 of FIG. 17.

Figure 19:
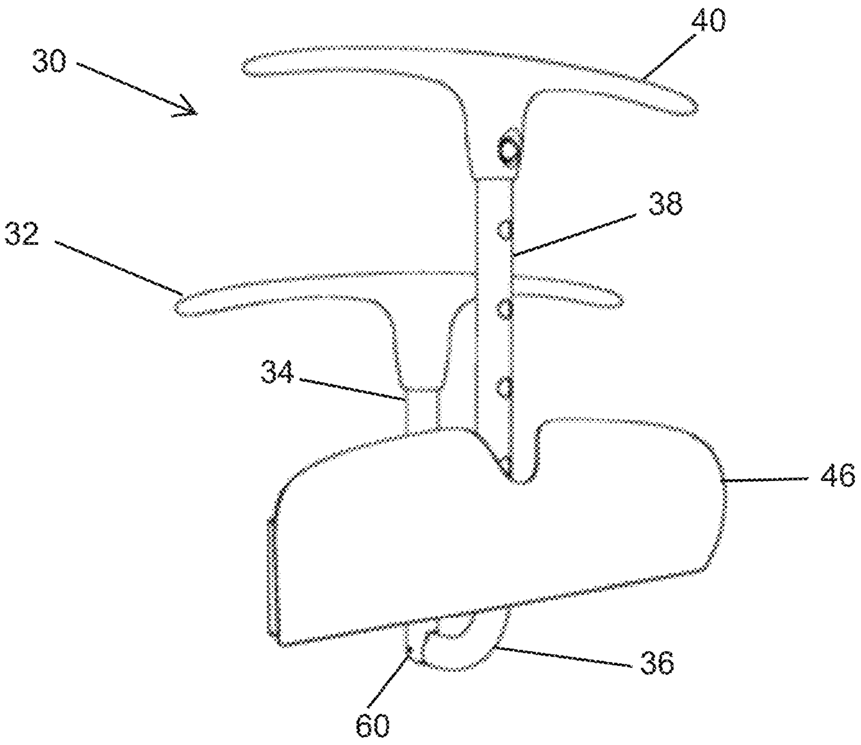
FIG. 19 illustrates the apparatus of FIG. 17 in a folded position.

FIG. 19 illustrates the apparatus 30 of FIG. 17 in a folded position.

Figure 20:
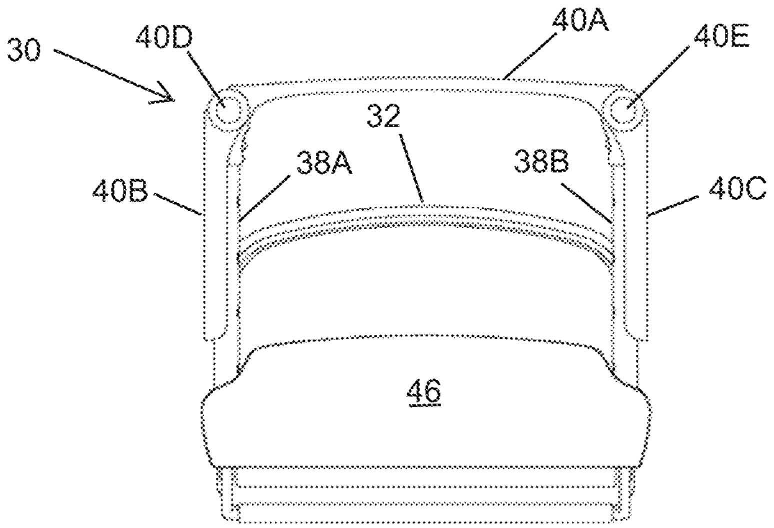
FIGS. 20 and 21 illustrate another embodiment of the apparatus wherein the top support is expandable.
Figure 21:
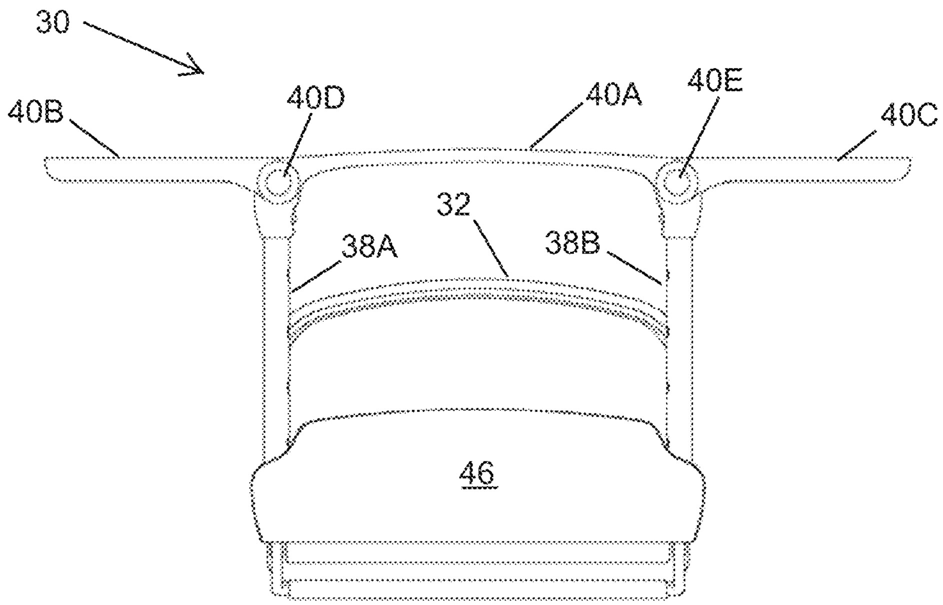

FIGS. 20 and 21 illustrate another embodiment of the apparatus 30 wherein the top support is expandable. The illustration is a rear view of the apparatus 30 when in the folded position. In this embodiment the top support has a center section 40A, a left arm 40B, and a right arm 40C. The left arm 40B and the right arm 40C are attached to the center section 40A by joints or hinges 40D and 40E. In FIG. 20 the arms 40B, 40C are in a folded position, and in FIG. 21 the arms 40B, 40C are in a fully expanded position. The arms 40B, 40C may also be placed, if desired, in a position between the folded position and fully expanded position. The arms 40B, 40C may be held in a desired position by, for example, friction, detents, pins, latches, or other convenient mechanism.

Figure 22:
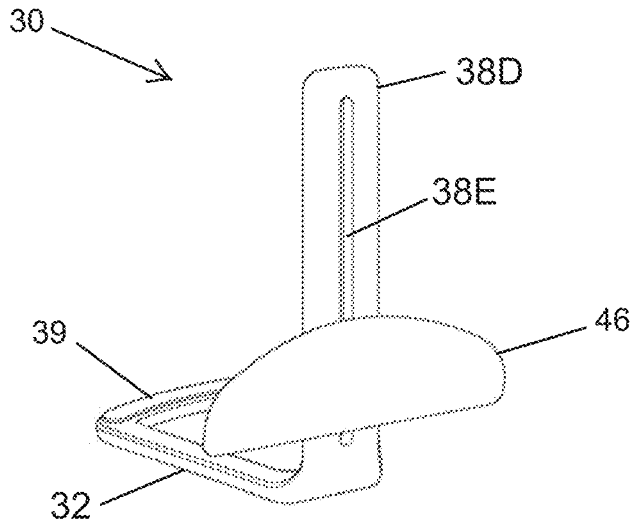
FIGS. 22 and 23 illustrate another embodiment of the apparatus having a base, a single riser having a slot therein, and a clip.
Figure 23:
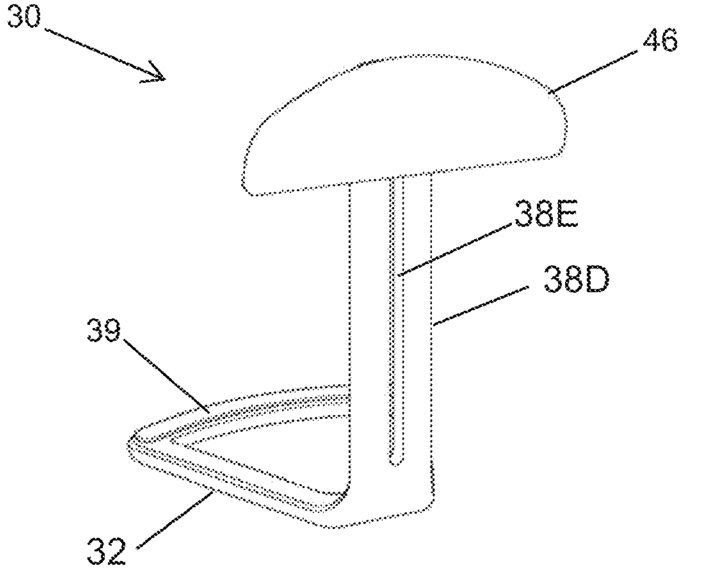

FIGS. 22 and 23 illustrate another embodiment of the apparatus 30, having a base 32, a single riser 38D having a slot 38E therein, and a clip 46. Preferably, but not necessarily, the base 32 and the single riser 32D are a single, unitary construction. In this embodiment the base 32 is preferably, but not necessarily, in the shape of a truncated triangle, with the truncated end of the triangle being joined to the riser 38D. Also shown is a friction strip 39. In this embodiment the height between the base 32 and the top of the riser 38D is fixed, but the clip 46 can be adjusted up or down as needed and may be held in the desired position either by friction or a restraining mechanism.

Figure 24:
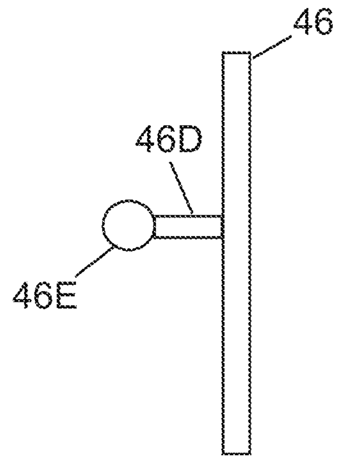
FIG. 24 illustrates a side view of a construction of the clip for use in the apparatus of FIGS. 22 and 23.

FIG. 24 illustrates a side view of a construction of the clip 46 for use in the apparatus 30 of FIGS. 22 and 23. The clip 46 has a shaft 46D which rides in the slot 38E. At the end of the shaft 46D is a knob, ball, plate, or other retaining device 46E which holds the clip 46 and the riser 38 together. The clip 46 may be placed in any desired position on the riser 38 by sliding the clip 46 up or down on the riser 38. The clip 46 may be held in the desired position by, for example, friction, detents, pins, latches, or other convenient mechanism. The clip 46 holds the bedding 18 against the riser 38D.

Figure 25:
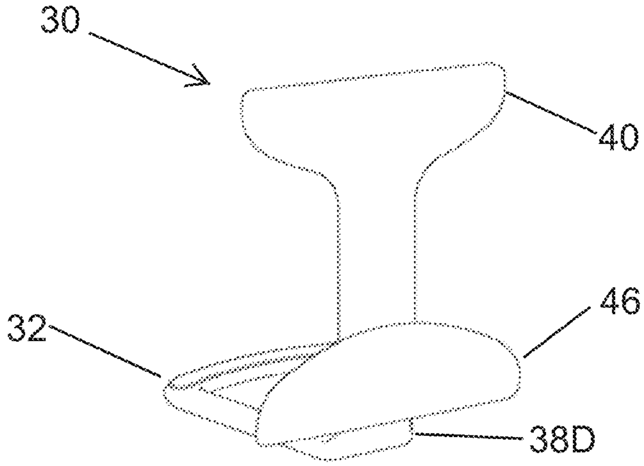
FIGS. 25 and 26 illustrate another embodiment of the apparatus having a base, a single riser having a slot therein, a clip, and a “T”-shaped top support.
Figure 26:
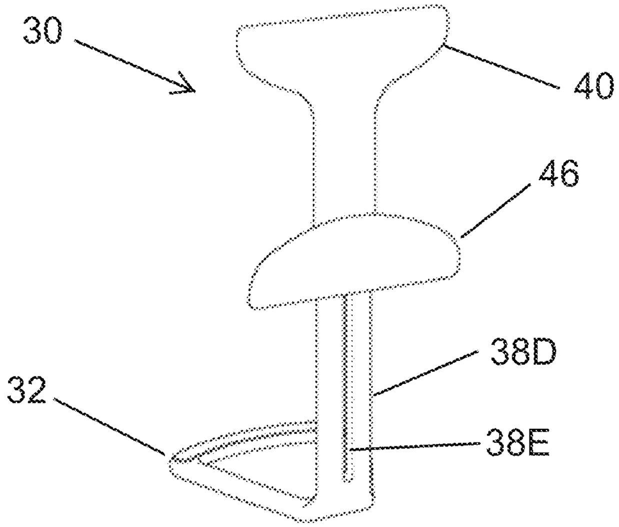

FIGS. 25 and 26 illustrate another embodiment of the apparatus 30 having a base 32, a single riser 38D having a slot 38E therein, a clip 46, and a "T"-shaped top support 40. In FIG. 25 the apparatus 30 is shown in the collapsed or lowered position. In FIG. 26 the apparatus 30 is shown in the extended or raised position. This embodiment is similar to the embodiment of FIGS. 22-24 but, in this embodiment, the lower end of the top support 40 is connected to the clip 46 so that the clip 46 and the top support 40 move up or down the riser 38D as a single unit. This secures the bedding 18 to the bottom of the top support 40 even while the height is being adjusted. Optionally, the top support 40 and the body of clip 46 may be formed as a single unit.

It will now be appreciated that one implementation of an adjustable bedding cover height and lengthwise positioning apparatus has:

- a base configured for positioning between a bed frame and a mattress;
- at least one riser;
- a connecting section connected between the base and the at least one riser, the connecting section being optionally rotatably connected to the base to allow rotation of the at least one riser with respect to the base;

a movable clip connected to the at least one riser to secure the bedding to the apparatus, the clip being movable along at least a portion of the at least one riser.

Another implementation of the adjustable bedding cover height and lengthwise positioning apparatus has a top support connected to the movable clip.

In another implementation of the adjustable bedding cover height and lengthwise positioning apparatus the at least one riser has a slot running lengthwise through at least a portion of the at least one riser, and the movable clip has a shaft which extends through the slot.

It will now be appreciated that another implementation of an adjustable bedding cover height and lengthwise positioning apparatus has:

a base having a first leg and an opposing second leg, the first and second legs configured to allow positioning of the base and a least a portion of the first leg and at least a portion of the second leg between a bed frame and an adjacent mattress;

a first extendable riser and an opposing second extendable riser;

a connecting section, connected to the first and second extendable risers and, optionally, rotatably connected to the base to allow rotation of the first and second extendable risers with respect to the base;

a clip connected to and between the first and second extendable risers.

Another implementation of an adjustable bedding cover height and length apparatus has:

a base having a first leg and an opposing second leg, the first and second legs configured to allow positioning of a least a portion of the first leg and at least a portion of the second leg between a bed frame and an adjacent mattress;

a first extendable riser and an opposing second extendable riser; and a connecting section, connected to the first and second extendable risers and, optionally, rotatably connected to the base, to allow rotation of the first and second extendable risers with respect to the base; and a top support connected to and between the first and second extendable risers toward or at the top of the first and second extendable risers.

The adjustable bedding cover height and length apparatus may have both the clip and the top support.

The first and second extendable risers may each be two or more telescoping tubes.

The clip may be movable along the first and second extendable risers.

The top support may be an arch.

It will also be appreciated that another implementation of an adjustable bedding cover height and lengthwise positioning apparatus has:

a base having a leg, the base and leg being configured to allow positioning of the base and a least a portion of the leg between a bed frame and an adjacent mattress;

an extendable riser, optionally rotatably connected to the leg to allow rotation of the riser with respect to the base;

a clip connected to and between the first and second extendable risers; and a top support connected to the top end of the extendable riser.

The base, the support, or both, of the adjustable bedding cover height and length apparatus may be "T"-shaped.

The base, the support, or both, of the adjustable bedding cover height and length apparatus may be "T"-shaped where the cross of the "T" is in the shape of an arch.

The extendable riser may be two or more telescoping tubes.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

The term "exemplary" is used herein to mean serving as an example, instance, or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner.

The terms "for example" and "such as" mean "by way of example and not of limitation." The subject matter described herein is provided by way of illustration for the purposes of teaching, suggesting, and describing, and not limiting or restricting. Combinations and alternatives to the illustrated embodiments are contemplated, described herein, and set forth in the claims.

For convenience of discussion herein, when there is more than one of a component, that component may be referred to herein either collectively or singularly by the singular reference numeral unless expressly stated otherwise or the context clearly indicates otherwise. For example, components 38 (plural) or component 38 (singular) may be used unless a specific component is intended. Also, the singular forms "a," "an," and "the" are intended to include the plural forms as well, unless expressly stated otherwise or the context indicates otherwise.

It will be further understood that the terms "includes," "comprises," "including," and/or "comprising" specify the presence of stated features, steps, operations, elements, and/or components, but do not preclude the presence or addition of one or more other features, steps, operations, elements, components, and/or groups thereof unless explicitly stated otherwise or the context clearly requires otherwise. The terms "includes," "has" or "having" or variations in form thereof are intended to be inclusive in a manner similar to the term "comprises" as that term is interpreted when employed as a transitional word in a claim.

It will be understood that when a component is referred to as being "connected" or "coupled" to another component, it can be directly connected or coupled or coupled by one or more intervening components unless expressly stated otherwise or the context clearly indicates otherwise.

The term "and/or" includes any and all combinations of one or more of the associated listed items. As used herein, phrases such as "between X and Y" and "between about X and Y" should be interpreted to include X and Y unless expressly stated otherwise or the context clearly indicates otherwise.

Terms such as "about", "approximately", and "substantially" are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of "approximately X inches" is recited, a lower or higher height is still "approximately X inches" if the desired function can still be performed or the desired result can still be achieved.

While the terms vertical, horizontal, upper, lower, bottom, top and the like may be used herein, it is to be understood that these terms are used for ease in referencing the drawing and, unless otherwise indicated or required by context, does not denote a required orientation.

The different advantages and benefits disclosed and/or provided by the implementation(s) disclosed herein may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, "can", "could", "might", or "may", unless specifically stated otherwise, or otherwise understood within the context as used, is generally intended to convey that certain embodiments preferably or optionally include certain features, elements and/or steps, while some other embodiments optionally do not include those certain features, elements and/or steps. Thus, such conditional language indicates, in general, that those features, elements and/or step may not be required for every implementation or embodiment.

Those skilled in the art will recognize many modifications may be made to the implementation(s) disclosed herein without departing from the scope or spirit of the claimed subject matter. The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the exemplary embodiments and applications illustrated and described, and without departing from the spirit and scope of the following claims.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims.

Although the subject matter presented herein has been described in language specific to components used therein, it is to be understood that the appended claims are not necessarily limited to the specific component or characteristic thereof described herein. Rather, the specific components and characteristics thereof are disclosed as example forms of implementing the claims.

The invention claimed is:

1. An apparatus for adjusting a bedding cover height on a mattress on a bed frame, the apparatus comprising:
- a base configured for positioning between the bed frame and the mattress;
- a first connection section and a second, opposing, connection section, connected to the base;
- a first telescoping riser and a second, opposing telescoping riser, the first telescoping riser being connectable to the first connection section, the second telescoping riser being connectable to the second connection section; and
- a clip connected to and between the first telescoping riser and the second telescoping riser, the clip being structured and disposed for securing the bedding cover to the apparatus;
- wherein the clip is movable along at least a portion of the first telescoping riser and of the second telescoping riser for selectively adjusting the height of the bedding cover.

2. The apparatus of claim 1 wherein the first connection section is insertable into the first telescoping riser.

3. The apparatus of claim 1 wherein the first telescoping riser and the second telescoping riser are extendable risers.

4. The apparatus of claim 1 and further comprising a top support connected to an end of the first telescoping riser and an end of the second telescoping riser, the end of the first telescoping riser and the end of the second telescoping riser being distal from the base.

5. The apparatus of claim 1 and further comprising a top support connected to an end of the first telescoping riser and an end of the second telescoping riser, the end of the first telescoping riser and the end of the second telescoping riser being distal from the base, the top support being in the form of an arch between the first telescoping riser and the second telescoping riser.

6. The apparatus of claim 1 and further comprising:
- a top support connected to an end of the first telescoping riser and an end of the second telescoping riser, the end of the first telescoping riser and the end of the second telescoping riser being distal from the base;
- the top support having a first arm at a first end of the top support and a second arm at an opposing second end of the top support; and
- the first arm and the second arm being positionable in at least a first position wherein the first arm and the second arm extend outward from the first telescoping riser and the second telescoping riser, respectively, and a second position wherein the first arm and the second arm extend adjacent to the first telescoping riser and the second telescoping riser, respectively.

7. The apparatus of claim 1 and further comprising:
- a center section between the first connection section and the second connection section; and
- wherein the base has a back side, the back side having an elongate inverted "U"; and
- the center section is inserted into the elongate inverted "U".

8. The apparatus of claim 1 and further comprising at least one friction strip on the base to prevent slippage of the apparatus when the apparatus is positioned between the bed frame and the mattress.

9. An apparatus for adjusting a bedding cover height on a mattress on a bed frame, the apparatus comprising:
- a base configured for positioning between the bed frame and the mattress;
- a first connection section and a second, opposing, connection section, the first connection section and the second connection section being connectable to the base;
- a first telescoping riser connected to the first connection section and a second, opposing telescoping riser connected to the second connection section; and a clip connected to and between the first telescoping riser and the second telescoping riser;

wherein the clip is movable along at least a portion of the first telescoping riser and of the second telescoping riser for selectively adjusting the height of the bedding cover.

10. The apparatus of claim 9 wherein the first connection section is insertable into the first telescoping riser.

11. The apparatus of claim 9 and further comprising a top support connected to an end of the first telescoping riser and an end of the second telescoping riser, the end of the first telescoping riser and the end of the second telescoping riser being distal from the base.

12. The apparatus of claim 9 and further comprising a top support connected to an end of the first telescoping riser and an end of the second telescoping riser, the end of the first telescoping riser and the end of the second telescoping riser being distal from the base, the top support being in the form of an arch between the first telescoping riser and the second telescoping riser.

13. The apparatus of claim 9 and further comprising:

a top support connected to an end of the first telescoping riser and an end of the second telescoping riser, the end of the first telescoping riser and the end of the second telescoping riser being distal from the base;

the top support having a first arm at a first end of the top support and a second arm at an opposing second end of the top support; and the first arm and the second arm being positionable in at least a first position wherein the first arm and the second arm extend outward beyond the first telescoping riser and the second telescoping riser, respectively, and a second position wherein the first arm and the second arm are adjacent to the first telescoping riser and the second telescoping riser, respectively.

14. An apparatus for adjusting a bedding cover height on a mattress on a bed frame, the apparatus comprising:

a base configured for positioning between the bed frame and the mattress;

a first connection section and a second, opposing, connection section, the first connection section and the second connection section being connectable to the base;

a first telescoping riser and a second, opposing telescoping riser, the first connection section being connectable to the first telescoping riser and the second connection section being connectable to the second telescoping riser; and a clip connectable to and between the first telescoping riser and the second telescoping riser;

wherein the clip is movable along at least a portion of the first telescoping riser and of the second telescoping riser for selectively adjusting the height of the bedding cover.

15. The apparatus of claim 14 wherein the clip is movable between a first position wherein the bedding is not secured to the apparatus and a second position wherein the bedding is secured to the apparatus.

16. The apparatus of claim 14 and further comprising at least one friction strip on the base to prevent slippage of the apparatus when the apparatus is positioned between the bed frame and the mattress.

17. The apparatus of claim 14 wherein the first connection section is insertable into the first telescoping riser.

18. The apparatus of claim 14 and further comprising:

a top support connected to an end of the first telescoping riser and an end of the second telescoping riser, the end of the first telescoping riser and the end of the second telescoping riser being distal from the base;

the top support having a first arm at a first end of the top support and a second arm at an opposing second end of the top support; and the first arm and the second arm being positionable in at least a first position wherein the first arm and the second arm extend outward beyond the first telescoping riser and the second telescoping riser, respectively, and a second position wherein the first arm and the second arm are adjacent to the first telescoping riser and the second telescoping riser, respectively.

* * * * *